United States Patent [19]

Massie

[11] 3,723,517

[45] Mar. 27, 1973

[54] OXIDATION OF ALKYL AROMATIC COMPOUNDS

[75] Inventor: Stephen N. Massie, Palatine, Ill.

[73] Assignee: Universal Oil Products Company, Des Plaines, Ill.

[22] Filed: Dec. 28, 1970

[21] Appl. No.: 102,054

[52] U.S. Cl. ............... 260/524 R, 260/592, 260/599, 260/618 C

[51] Int. Cl. ....C07c 47/54, C07c 49/78, C07c 63/02

[58] Field of Search .......260/524 R, 592, 599, 618 C

Primary Examiner—Henry R. Jiles
Assistant Examiner—R. S. Weissberg
Attorney—James R. Hoatson, Jr. and Raymond H. Nelson

[57] ABSTRACT

Alkyl aromatic compounds, and particularly alkyl aromatic hydrocarbons, are oxidized by treating with an oxygen-containing gas in the presence of a catalyst comprising a thallium-containing compound to form oxygenated aromatic compounds.

9 Claims, No Drawings

OXIDATION OF ALKYL AROMATIC COMPOUNDS

SPECIFICATION

This invention relates to a process for preparing oxygenated aromatic compounds by treating an alkyl aromatic compound with an oxygen-containing gas in the presence of certain catalytic compositions of matter of a type hereinafter set forth in greater detail.

Oxygenated aromatic compounds constitute an important class of chemical compounds which are useful for a variety of purposes. For example, benzaldehyde is useful in organic synthesis, especially for dyes and dye intermediates. In addition it is also useful as a solvent for oils, resins, some cellulose ethers, cellulose acetate and cellulose nitrate. Other uses for this compound will include use in flavoring compounds, in the production of synthetic perfumes, in the manufacture of cinnamic acid, in toilet preparations and soaps, in photographic chemicals, in baking chemicals and in medicine. Benzoic acid which is another oxidation product prepared by the process of this invention is used as a mordant in calico printing, it is also used in seasoning tobacco and improving the aroma, in flavoring perfumes, in dentifrices in medicines as a germacide, in textiles, in dye, as a plasticizer and resin intermediate, etc. Another product of the process of this invention comprises benzyl alcohol which is used as a solvent in perfumery and flavoring materials, as an intermediate in preparing other benzyl esters and ethers, as a high boiling solvent in cellulose derivatives production and also as a solvent for cellulose esters and ethers. Another use for this compound includes the use in resins, lacquer, films and in paint and varnish removers.

It is therefore an object of this invention to provide a process for the oxidation of alkyl substituted aromatic compounds.

A further object of this invention is to provide a process for preparing oxygenated aromatic compounds utilizing alkyl substituted aromatic hydrocarbons as the starting material.

In one aspect an embodiment of this invention resides in a process for the oxidation of an alkyl substituted aromatic hydrocarbon which comprises treating said alkyl substituted aromatic hydrocarbon with an oxygen-containing gas in the presence of a homogeneous catalyst comprising a thallium-containing compound at oxidation conditions, and recovering the resultant oxygenated aromatic compound.

A specific embodiment of this invention resides in the process for the preparation of oxygenated aromatic compounds which comprises treating toluene with air in the presence of thallium benzoate at a temperature in the range of from about 100° to about 250°C. and a pressure in the range of from atmospheric to about 100 atmospheres, and recovering the resultant benzyl alcohol, benzaldehyde, and benzoic acid.

Other objects and embodiments will be found in the following further detailed description of the present invention.

As hereinbefore set forth, the present invention is concerned with the process for the oxygenation of alkyl substituted aromatic compounds, and particularly alkyl substituted aromatic hydrocarbons to prepare the corresponding first, second and third stage oxygenation products, namely, the corresponding alcohols, aldehydes, and acids. The oxygenation is effected in the presence of certain catalytic compositions of matter comprising thallium-containing compounds. That the use of a thallium-containing compound as a catalyst in the oxygenation of alkyl substituted aromatic hydrocarbons would be effective is unexpected, in view of the fact that thallium is a member of Group IIIA of the Periodic Table and it is known that aluminum-containing compounds are ineffective oxidation catalysts. Examples of alkyl substituted aromatic compounds which may undergo oxidation to form the corresponding alcohols, aldehydes and acids will include both mono- and polyalkyl substituted aromatic hydrocarbons such as toluene, ethylbenzene, n-propylbenzene, n-butylbenzene, n-amylbenzene, o-xylene, m-xylene, p-xylene, o-diethylbenzene, m-diethylbenzene, p-diethylbenzene, o-dipropylbenzene, m-dipropylbenzene, p-dipropylbenzene, mesitylene, pseudocumene, hemimellitene, durene, isodurene, prehnitene, pentamethylbenzene, hexamethylbenzene, etc.; 1-methylnaphthalene, 2-methylnaphthalene, 1-ethylnaphthalene, 2-ethylnaphthalene, 1-n-propylnaphthalene, 2-n-propylnaphthalene, 1-methylanthracene, 2-methylanthracene, 1-ethylanthracene, 2-ethylanthracene, etc. It is to be understood that the aforementioned alkyl substituted aromatic hydrocarbons are only representative of the class of compounds which may be utilized as a starting material, and that the present invention is not necessarily limited thereto.

Oxidation reaction conditions under which the process of the present invention is effected will include elevated temperatures, preferably in a range of from about 100° to about 250°C. and a pressure ranging from atmospheric up to about 100 atmospheres or more. The oxidation agent which is utilized to prepare the desired product will comprise an oxygen-containing gas such as air or oxygen, the former constituting the preferred oxidation agent due to the greater availability and lower cost.

As hereinbefore set forth, the oxidation reaction is effected in the presence of a catalyst comprising a thallium-containing compound. In the preferred embodiment of the invention, the thallium-containing compound will comprise a compound which is homogeneous with the alkyl substituted aromatic hydrocarbon undergoing oxygenation. Some specific examples of these homogeneous thallium-containing compounds will include the salts of thallium and preferably the salts of organic acids such as acetic acid, propionic acid, butyric acid, valeric acid, caproic acid, hexanoic acid, caprylic acid, 2-ethylhexanoic acid, capric acid, cyclohexanoic acid, benzoic acid, toluic acid, etc., said salts being thallium acetate, thallium propionate, thallium butyrate, thallium valerate, thallium caproate, thallium heptylate, thallium caprylate, thallium cyclohexylate, thallium benzoate, thallium toluoate, etc. It is to be understood that the aforementioned thallium-containing compounds are only representative of the class of compounds which may be used and that the present invention is not necessarily limited thereto. In addition, it is also contemplated that thallium salts of some inorganic acids which are homogeneous with respect to the starting materials may be used, although not necessarily with equivalent results, said salts including thallous bromide, thallium tribromide, thallous chloride, thallium trichloride, thallous iodide, thallium triiodide, etc.

The process of this invention may be effected in any suitable manner and may comprise either a batch or continuous type operation. For example, when a batch type operation is used, a quantity of the starting material comprising the alkyl substituted aromatic hydrocarbon is placed in an appropriate apparatus which may comprise a flask, or if superatmospheric pressures are to be employed, an autoclave of the rotating or mixing type. In addition, the apparatus will also contain the thallium-containing catalyst. Following this, the oxidation agent comprising an oxygen-containing gas is charged to the reactor which is thereafter heated to the desired operating temperature. Upon completion of the predetermined residence time which may range from about 0.5 up to about 20 hours or more in duration, heating is discontinued, the apparatus is allowed to return to room temperature and, if at superatmospheric pressures, the excess pressure is discharged. The reaction mixture is recovered from the apparatus and subjected to conventional means of purification which will include washing, drying, extraction, fractional distillation, etc., whereby the desired oxygenated products comprising alcohols, aldehydes, and acids are recovered and separated.

It is also contemplated within the scope of this invention that the process may be effected in a continuous manner of operation. When such a type of operation is used, the alkyl substituted aromatic hydrocarbon is continuously charged to the reaction vessel which is maintained at the proper operating conditions of temperature and pressure. The thallium-containing catalyst may, if so desired, be charged with the alkyl aromatic hydrocarbon inasmuch as said catalyst is homogeneous with respect to the starting material and may be dissolved therein. In addition, the oxidation agent comprising an oxygen-containing gas such as air or oxygen is also continuously charged to the reactor. Upon completion of the desired residence time, the reactor effluent is continuously discharged and subjected to separation means of the type hereinbefore set forth whereby the desired oxygenated products comprising aromatic alcohols, acids, and aldehydes are recovered, while any unreacted starting materials and catalysts are recycled to the reaction zone to form a portion of the feed stock.

The following examples are given to illustrate the process of the present invention which, however, are not intended to limit the generally broad scope of the present invention in strict accordance therewith.

EXAMPLE I

In this example 60 g. of toluene and 2 g. of a catalyst comprising thallium benzoate were placed in the glass liner of a rotating autoclave. The autoclave was sealed and air pressed in until an initial pressure of 35 atmospheres was reached. The autoclave was then heated to a temperature of 180°C. and maintained thereat for a period of 16 hours, during which time the maximum pressure rose to 58 atmospheres. At the end of this time, heating was discontinued and the autoclave allowed to return to room temperature, the final pressure at room temperature being 30 atmospheres. The excess pressure was discharged and the autoclave was opened. The reaction mixture was recovered and subjected to a gas-liquid chromatographic analysis, the oxidized product comprising 247 mmols of benzoic acid, 33 mmols of benzaldehyde and 4 mmols of benzyl alcohol per mol of oxygen charged to the reactor.

EXAMPLE II

In this example 60 g. of ethylbenzene and 2 g. of thallium benzoate are placed in the glass liner of a rotating autoclave. The autoclave is thereafter sealed and air pressed in until an initial pressure of 35 atmospheres is reached. The autoclave is then heated to a temperature of 180°C. and maintained thereat for a period of 16 hours, the maximum pressure at this temperature reaching about 60 atmospheres. At the end of the aforementioned 16 hour period, heating is discontinued and the autoclave is allowed to return to room temperature. The excess pressure is discharged, the autoclave is opened and the reaction mixture is recovered therefrom. Analysis of the product by means of a gas-liquid chromatograph will disclose the presence of $\alpha$-methylbenzyl alcohol, acetophenone, and benzoic acid, the latter being the predominant product.

EXAMPLE III

A charge comprising 60 g. of p-xylene, and 2 g. of thallium acetate is placed in the glass liner of a rotating autoclave which is thereafter sealed. Oxygen is then pressed in until an initial pressure of 25 atmospheres is reached, and the autoclave is then heated to a temperature of 180°C. After maintaining the autoclave at this temperature for a period of 16 hours, during which time the maximum pressure will rise to about 60 atmospheres, heating is discontinued and the autoclave is allowed to return to room temperature. The excess pressure is then discharged, the autoclave is opened and the reaction mixture is recovered. Analysis of the mixture by means of a gas-liquid chromatograph utilizing methyl ester derivatives of the carboxylic acids will disclose the presence of 4-methylbenzyl alcohol, 4-methylbenzaldehyde, 4-methylbenzoic acid, and 1,4-benzenedicarboxylic acid.

EXAMPLE IV

A charge stock consisting of 60 g. of mesitylene and 2 g. of thallium benzoate catalyst is placed in the glass liner of a rotating autoclave which is thereafter sealed. Air is pressed in until an initial operating pressure of 35 atmospheres is reached and the autoclave is heated to a temperature of 200°C. After maintaining the autoclave at this temperature for a period of 16 hours, heating is discontinued and the autoclave is allowed to return to room temperature. The excess pressure is then discharged, the autoclave is opened and the reaction mixture is recovered therefrom. The mixture is then subjected to a gas-liquid chromatographic analysis which will disclose the presence of 3,5-dimethylbenzyl alcohol, 3,5-dimethylbenzaldehyde, 3,5-dimethylbenzoic acid, 5-methyl-1,3-benzenedicarboxylic acid, and 1,3,5-benzenetricarboxylic acid.

I claim as my invention:

1. A process for the oxidation of an alkyl substituted aromatic hydrocarbon which comprises treating said alkyl substituted aromatic hydrocarbon with an oxygen containing gas in the presence of a thallium containing compound at oxidation conditions including a temperature in the range of from about 100° to about 250°C. and a pressure in the range of from about atmospheric to about 100 atmospheres, and recovering the resultant oxygenated aromatic compound.

2. The process as set forth in claim 1 in which said oxygen containing gas is oxygen.

3. The process as set forth in claim 1 in which said oxygen containing gas is air.

4. The process as set forth in claim 1 in which said thallium containing compound is thallium benzoate.

5. The process as set forth in claim 1 in which said thallium containing compound is thallium acetate.

6. The process as set forth in claim 1 in which said alkyl aromatic hydrocarbon is toluene and said oxygenated alkyl aromatic compounds are benzyl alcohol, benzaldehyde and benzoic acid.

7. The process as set forth in claim 1 in which said alkyl aromatic hydrocarbon is ethylbenzene and said oxygenated alkyl aromatic compounds are α-methylbenzyl alcohol, acetophenone and benzoic acid.

8. The process as set forth in claim 1 in which said alkyl aromatic hydrocarbon is p-xylene and said oxygenated alkyl aromatic compounds are 4-methylbenzyl alcohol, 4-methylbenzaldehyde, 4-methylbenzoic acid and 1,4-benzenedicarboxylic acid.

9. The process as set forth in claim 1 in which said alkyl aromatic hydrocarbon is mesitylene and said oxygenated alkyl aromatic compounds are 3,5-dimethylbenzyl alcohol, 3,5-dimethylbenzaldehyde, 3,5-dimethylbenzoic acid, 5-methyl-1,3-benzenedicarboxylic acid and 1,3,5-benzenetricarboxylic acid.

* * * * *